Feb. 28, 1933.  E. C. BRITTON ET AL  1,899,257

PROCESS FOR THE PURIFICATION OF DIPHENYLOXIDE

Filed March 3, 1932

INVENTORS
Edgar C. Britton and
BY    William R. Reed
Thomas Griswold, Jr.
ATTORNEY Patented Feb. 28, 1933

1,899,257

UNITED STATES PATENT OFFICE

EDGAR C. BRITTON AND WILLIAM R. REED, OF MIDLAND, MICHIGAN, ASSIGNORS TO THE DOW CHEMICAL COMPANY, OF MIDLAND, MICHIGAN, A CORPORATION OF MICHIGAN

PROCESS FOR THE PURIFICATION OF DIPHENYLOXIDE

Application filed March 3, 1932. Serial No. 596,558.

The invention relates to a process for the purification of diphenyloxide by crystallization from a solution in a solvent medium; and more particularly to a process wherein methyl alcohol is used as a solvent.

Ordinary methods for the preparation of diphenyloxide yield a product containing impurities such as monochlorobenzene, naphthalene, and hydroxy diphenyl, from which the diphenyloxide can not be completely freed by distillation. Crystallization from a solvent is the other common method for the purification of organic compounds, but in the case of diphenyloxide this is rendered difficult or impractical by the extreme solubility of diphenyloxide in most organic solvents.

The use of ethyl alcohol has been proposed in connection with laboratory methods for the purification of diphenyloxide. However, ethyl alcohol becomes saturated with diphenyloxide at a relatively low temperature and at higher temperatures it forms liquid mixtures with diphenyloxide from which the diphenyloxide can not be crystallized.

We have found that methyl alcohol is largely free from the limitations of ethyl alcohol because it does not form non-crystallizable liquid mixtures with diphenyloxide.

To the foregoing and related ends, the invention, then, consists in the method hereinafter fully described and particularly pointed out in the claims, the annexed drawing and the following description setting forth in detail one mode of carrying out the invention, such disclosed mode illustrating, however, but one of the various ways in which the principle of the invention may be realized.

In said annexed drawing:—

Figure 1:
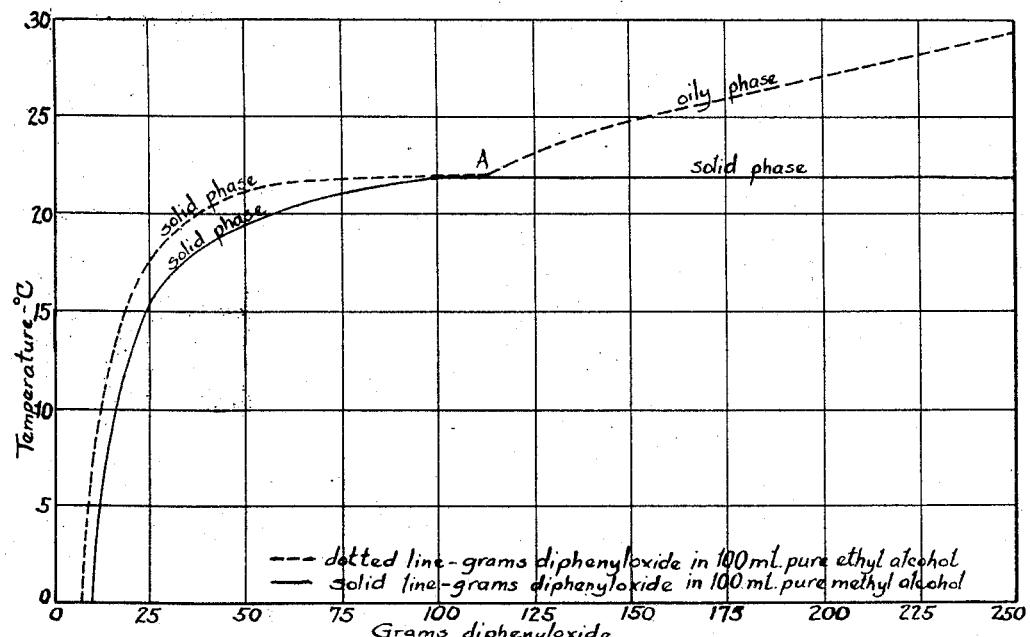
Figure 2:
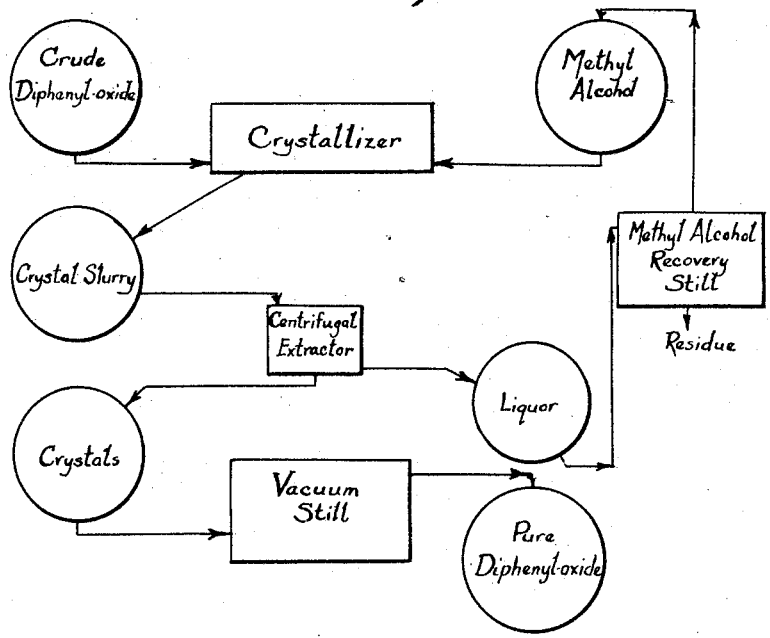

Figure 1 shows the solubility curve of diphenyloxide in methyl alcohol and in ethyl alcohol. Figure 2 is a flow sheet representing diagrammatically the flow of materials through apparatus adapted to carry out our process.

Referring to Figure 1, the dotted line curve shows the solubility of diphenyloxide in ethyl alcohol. Point A on this curve represents the upper limit of true solubility of dephenyloxide in ethyl alcohol. This upper limit is about 115 grams of diphenyloxide per 100 milliliters of ethyl alcohol, and a solution prepared in this ratio will yield, upon cooling below 22° C., purified crystals of diphenyloxide. For instance, cooling a solution of 115 grams of diphenyloxide in 100 milliliters of ethyl alcohol to about 10° C. will precipitate about 100 grams of diphenyloxide crystals. However, it is impossible to obtain larger yields of diphenyloxide crystals per 100 milliliters of ethyl alcohol, because, while it is possible to form liquid mixtures containing more than 115 grams of diphenyloxide per 100 milliliters of ethyl alcohol at temperatures above 22° C., as such liquid mixtures are cooled back to 22° C. any amount of diphenyloxide in excess of the aforesaid ratio will separate as an oil instead of as crystals, and the oil will retain the impurities contained in the original diphenyloxide. The use of ethyl alcohol as a solvent for purifying diphenyloxide is therefore limited in that the maximum ratio that can be used effectively is 115 grams of diphenyloxide per 100 milliliters of ethyl alcohol.

On the other hand, the solid line methyl alcohol solubility curve shows that at least 250 grams of diphenyloxide can be dissolved in 100 milliliters of methyl alcohol to form a true solution from which the diphenyloxide will crystallize readily as a solid upon lowering the temperature of the solution. For instance, 250 grams of diphenyloxide can be dissolved in 100 milliliters of methyl alcohol at about 23° C. and upon cooling the solution to about 10° C. over 230 grams of diphenyloxide crystals will precipitate. It is therefore apparent that considerably more than twice the amount of diphenyloxide can be crystallized from methyl alcohol as can be crystallized from an equal amount of ethyl alcohol. The significance of this lies in the fact that less than one-half the amount of methyl alcohol will be required for recrystallizing a given amount of diphenyloxide that would be required if ethyl alcohol were used as the solvent.

Referring to Figure 2, the flow of materials through an apparatus suitable for carrying out our process will be described. Crude diphenyloxide is introduced, along with about 40 per cent of its own volume of methyl alcohol, into a crystallizer and heated to a temperature between 23°–30° C. After the diphenyloxide is completely dissolved the solution is cooled to a temperature between 15°–21° C. without precipitating crystals, due to the supercooling of the solution. The solution is preferably to be cooled slowly and agitated during the cooling period. When a temperature between 15°–21° C., preferably about 18° C., is reached, the solution may be seeded with pure diphenyloxide crystals. As the crystals separate the temperature of the solution rises almost immediately to 21.5° C. The mass is then cooled to about 10° C. to precipitate a further quantity of the diphenyloxide crystals, after which the crystals are removed in a slurry of mother liquor to a centrifugal extractor wherein the mother liquor is removed and passed into a methyl alcohol recovery still. The methyl alcohol from the still is recycled to the crystallizer. The crystals from the extractor are preferably to be further purified and any occluded mother liquor separated therefrom, by distilling under reduced pressure, e. g. between 25 to 75 millimeters of mercury absolute. By this method crystals of diphenyloxide having a purity above 99 per cent are obtained.

A further advantage accrues to our process by virtue of the fact that diphenyloxide can be crystallized from methyl alcohol in the presence of substantial quantities of water, say about 7 per cent by volume, while the presence of even as little as 3 per cent by volume of water in an ethyl alcohol solution of diphenyloxide will cause the diphenyloxide to precipitate as an oil instead of crystals when the solution is cooled. This assumes added significance when the point of completely freeing the solvent from water by distillation is considered. Ethyl alcohol forms an azeotropic solution with water, containing about 3 per cent of water by volume, from which the water can efficiently be removed only by chemical action. In contrast, methyl alcohol can be completely freed of water by the inexpensive procedure of simple distillation.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. The process for obtaining substantially pure diphenyloxide which comprises crystallizing diphenyloxide from solution in methyl alcohol.

2. In a process for the purification of crude diphenyloxide, the steps which consist in forming a solution of crude diphenyloxide in methyl alcohol, cooling said solution to precipitate diphenyloxide crystals, and separating said crystals from the solution.

3. In a process for the purification of crude diphenyloxide, the steps which consist in forming a solution of crude diphenyloxide in methyl alcohol, cooling said solution to precipitate diphenyloxide crystals, separating the crystals from the solution, and distilling said crystals under reduced pressure.

4. In a process for the purification of crude diphenyloxide, the steps which consist in forming a solution by dissolving crude diphenyloxide in methyl alcohol at a temperature between 23°–30° C., cooling said solution to a temperature between 15°–21° C. to precipitate diphenyloxide as crystals, separating said crystals from the mother liquor, distilling said mother liquor so as to recover the methyl alcohol and returning the so-recovered methyl alcohol to the first step, and distilling the said crystals under a reduced pressure of between 25 and 75 millimeters absolute.

5. In a process of recovering substantially pure diphenyloxide from crude diphenyloxide, the steps which consist in forming a solution by dissolving crude diphenyloxide in about 40 per cent of its own volume of methyl alcohol at a temperature between 23°–30° C., cooling said solution to a temperature of approximately 18° C., seeding the so cooled solution with pure diphenyloxide crystals, further cooling the solution to approximately 10° C. while precipitating diphenyloxide crystals, separating said crystals from the mother liquor, distilling said mother liquor so as to recover the methyl alcohol, returning the so recovered methyl alcohol to the first step, and further purifying said diphenyloxide crystals by distilling same under a reduced pressure of between 25 and 75 millimeters of mercury absolute.

Signed by us this 23rd day of February 1932.

EDGAR C. BRITTON.
WILLIAM R. REED.